Dec. 21, 1937.   W. UYTERHOEVEN ET AL   2,103,046
GASEOUS ELECTRIC DISCHARGE LAMP DEVICE
Filed Aug. 25, 1934
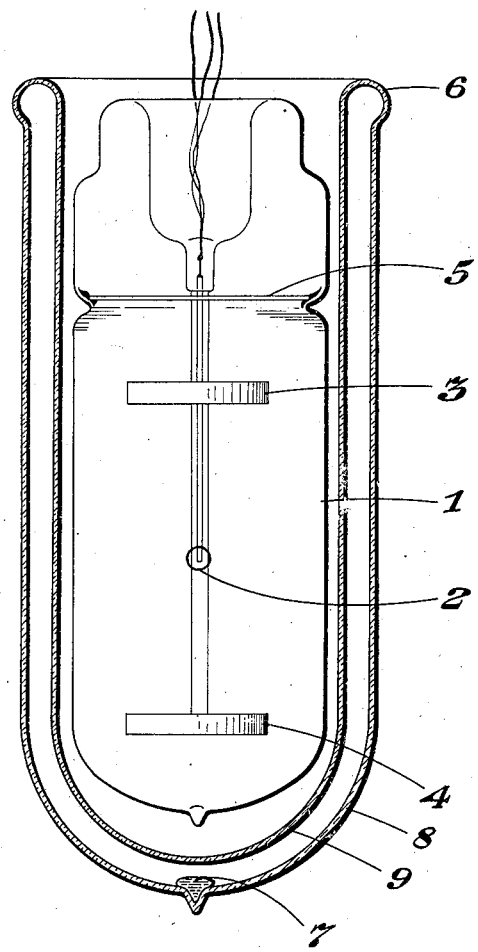
INVENTORS
Willem Uyterhoeven
Cornelis Verburg
BY Harry E. Durham
ATTORNEY Patented Dec. 21, 1937

2,103,046

UNITED STATES PATENT OFFICE 2,103,046

GASEOUS ELECTRIC DISCHARGE LAMP DEVICE

Willem Uyterhoeven and Cornelis Verburg, Eindhoven, Netherlands, assignors to General Electric Company, a corporation of New York Application August 25, 1934, Serial No. 741,400 In Germany September 13, 1933

1 Claim. (Cl. 240—11.4)

The present invention relates to gaseous electric discharge lamp devices generally.

Gaseous electric discharge lamp devices utilizing metal vapor as a light giving element, particularly mercury vapor, are efficient light sources. Recently difficultly vaporizable metals, that is those metals the vapor pressure of which is less than 1 mm. at a temperature of 200° C., such as sodium, cadmium, thalium or magnesium, have been used as a light giving element in gaseous electric discharge lamp devices. In these lamp devices it is desirable that the container be maintained at an elevated temperature in order to maintain an effective metal vapor pressure therein during the operation of the lamp device. By an effective metal vapor pressure is meant a pressure such that the spectrum of the lamp is rich in light rays characteristic of the metal vapor. A heat conservator which reduces the heat transferred from the lamp container to the ambient atmosphere is effective for this purpose and the use of such conservator increases the efficiency of the lamp device. An evacuated envelope enclosing the container of the lamp device is a useful heat conservator and a double walled jacket having the space between the walls thereof evacuated is also useful as a heat conservator. The evacuated space in both types of heat conservators acts as a thermal insulator for the lamp device to reduce the transfer of heat therefrom to the ambient atmosphere which increases the efficiency of the lamp device. The double walled jacket has many advantages over the evacuated envelope. The lamp device and the jacket are separate elements of the lamp unit and these elements can be separately replaced and manufactured which simplifies the problems connected with the manufacture and the transportation of the lamp unit and reduces the replacement cost of the lamp unit. Another advantage of the double walled jacket over the envelope is that the air present between the inner wall of the jacket and the lamp container equalizes the temperature over the wall of the container. While the above types of heat conservators reduces the heat transferred from the lamp container to the ambient atmosphere the vapor pressure in the lamp and, consequently, the efficiency thereof is affected by ambient temperature changes and by changes in ambient weather conditions. In the case of a double walled jacket changes in the temperature of the outer wall thereof, caused by ambient temperature changes, or by wind, rain or snow, affects the vapor pressure in the lamp device and consequently, the efficiency of the lamp.

The object of the present invention is to effectively eliminate the effect of changes in weather conditions on the vapor pressure and the efficiency of the lamp device in lamp units of the above types. Another object of the invention is to reduce the time required for the vapor in the lamp device to attain an effective pressure. Still further objects and advantages attaching to the device and to its use and operation will be apparent to those skilled in the art from the following particular description.

The invention attains its objects by providing in the evacuated space about the container of the lamp device a material which gives off gas or vapor in response to increasing temperature and which returns to its original state when the temperature drops.

In order that the invention may be readily understood take, for example, a lamp unit comprising a gaseous electric discharge device, the gaseous atmosphere of which during the operation thereof comprises sodium vapor, and a double walled jacket having the space between the walls thereof evacuated and in which jacket said lamp device is mounted. Heat is transferred from the container of the lamp device to the inner wall of the jacket by radiation and by conduction and convection through the air in the space between the jacket and the lamp container. Heat is transferred from the inner wall of the evacuated jacket to the outer wall thereof by radiation. When the temperature of the outer wall increases in response to an increasing ambient temperature the quantity of heat radiated from the outer wall back to the inner wall of the jacket increases which results in an increase in the temperature of the lamp container and an increase in the vapor pressure in the lamp.

When, in accordance with the present invention, vapor or gas generating material is mounted in the space between the walls of the jacket the transfer of heat from the inner wall to the outer wall of the jacket takes place through the gas or vapor evolved from the material, that is, by conduction and convection, as well as by radiation. When the material has the property of developing more gas or vapor as the temperature of the outer wall of the jacket increases then the quantity of heat transferred from said inner wall to said outer wall by conduction and convection increases as the temperature of the outer wall increases. Thus the decrease in radiation of heat from the inner wall to the outer wall is compensated for by conduction and convection through the gas or vapor and the temperature of the lamp container and the vapor pressure therein remain substantially unchanged even though the ambient temperature increases.

The material placed in the evacuated space of the lamp unit must be of such nature that the pressure of the gas or vapor generated thereby is effective for the contemplated effect at the temperatures to which such material is heated during the operation of the lamp unit. In short the pressure of the gas or vapor should be below that pressure above which changes in pressure have no effect on the quantity of heat transmitted by the gas or vapor.

Mercury is a suitable vapor generating material for use in the above described lamp unit. The mercury vapor pressure is controlled by the temperature of the outer wall of the jacket and as the temperature of the outer wall increases the vapor pressure and the conduction and convection of heat by the vapor increases. When the temperature of the outer wall decreases the vapor condenses to its liquid state and the conduction and convection of heat by the vapor decreases. Other vaporizable materials, such as high boiling point oils, mercury bromide ($HgBr_2$) or brom-naphthalin, are used, when desired.

Materials which dissociate and generate a gas or a vapor when heated are useful in this connection. For example, sodium boron fluoride ($NaBF_4$) when subjected to heat dissociates into sodium fluoride ($NaF$) and boron fluoride ($BF_3$). The first is a solid and the latter a vapor. The reaction is a reversible one so that the pressure of the boron fluoride vapor changes as the temperature of the outer wall of the jacket changes. Another useful material which reacts similarly to heat is one having the formula $K_2H_2F_2O_7$. This material dissociates into $2KFO_3$ and $H_2O$ when heated.

When the gas or vapor pressure is too low for the desired results at the temperature of the outer wall of the jacket the generating material is mounted in a part of said jacket which is at a higher temperature than said outer wall during the operation of the lamp unit. The temperature of said part must change as the temperature of the outer wall changes so that the desired changes in the gas or vapor pressure take place. A suitable structure is disclosed in the German application, Serial Number 35,660, filed in Germany August 28, 1933, the inventors being Cornelis Bol, Mari Johan Druyvesteyn and Pieter Schouwstra, said application belonging to the Philips Gloeilampenfabrieken of Eindhoven, Holland. The structure disclosed in said application is a double walled jacket having a light transmitting glass screen interposed between the walls thereof. The temperature of the screen is higher than the temperature of the outer wall of the jacket during the operation of the device. A material of the type indicated above, such as manganese carbonate, is applied to the screen. Manganese carbonate dissociates and forms $MnO$ and $CO_2$. It is not effective to apply this material to the inside of the outer wall of the jacket in many types of lamp units as the temperature of said outer wall during the operation of the lamp device is too low for an effective pressure of the $CO_2$ to develop.

When the gas or vapor generating material used is solid at ordinary temperatures it is advantageous to spread such material over a comparatively large surface so that equilibrium will be reached quickly at different temperatures. When such material is opaque in its solid state it is advantageous to spread it in a thin, light transmitting layer on said surface.

The presence of the vapor or gas generating material in the evacuated space in the heat conservator reduces the time required for the vapor in the lamp to reach an effective pressure. When the lamp device is started into operation the gas or vapor pressure in the heat conservator is very low so that the quantity of heat transferred through this gas or vapor is very small. No appreciable quantity of heat is transferred through the gas or vapor in the heat conservator until the pressure thereof is increased by the temperature of the outer wall of the heat conservator.

In the drawing accompanying and forming part of this specification an embodiment of the invention is shown in front elevational, partly sectional view.

Referring to the drawing the new and novel lamp unit comprises a gaseous electric discharge lamp device having a tubular container 1. A thermionic cathode 2 which consists of a coiled metal filament, such as a tungsten filament, having another filament, such as a nickel filament, wrapped around said tungsten filament and a coating of electron emitting material, such as barium oxide, on said filaments, is sealed into said container 1. Said cathode 2 is viewed end-on in the drawing. A pair of annular anodes 3 and 4 are likewise sealed into said container 1 and said anodes 3 and 4 are mounted on opposite sides of and at equal distances from said cathode 2. Said container 1 has a fixed gas, such as neon, and a vaporizable material, such as sodium, therein. A septum 5 of material resistant to the hot metal vapor divides the stem part of the container 1 from the part of the container 1 enclosing said electrodes 2, 3 and 4. The sodium is located in the electrode enclosing part of the container 1 and said septum 5 keeps the hot metal vapor out of the stem part of the container, which is the coolest part thereof, during the operation of the device.

The gaseous electric discharge lamp device is mounted in a heat conservator which is a double walled jacket 6 having the space between the walls 8 and 9 thereof evacuated. The evacuated space in the jacket acts as a thermal insulator for the electric discharge lamp device and the lamp device is maintained at an elevated temperature and the vapor therein at an effective pressure during the operation of the device. A quantity 7 of vaporizable material, such as mercury, is located in the space between said walls 8 and 9. The mercury vaporizes during the operation of the lamp unit and the vapor pressure thereof depends upon the temperature of the outer wall 8. The transmission of heat from the inner wall 9 to the outer wall 8 depends upon the mercury vapor pressure and thus on the temperature of the outer wall 8, among other factors. Heat is also transferred from said inner wall 9 to said outer wall 8 by radiation. When the temperature of the outer wall 8 increases, caused by an increasing ambient temperature, the quantity of heat transferred through the mercury vapor from said inner wall 9 to said outer wall 8 increases which compensates for the reduced net quantity of heat transferred by radiation. When the temperature of the outer wall 8 drops in response to a drop in ambient temperature, for example, the mercury vapor pressure decreases and the quantity of heat transferred by conduction and convection through the mercury vapor decreases. The net transfer of heat from said inner wall 9 to said outer wall 8 by radiation increases under these conditions however. The temperature of the lamp container 1, the vapor pressure in said container and hence the efficiency of the lamp device is therefore effectively independent of changes in the temperatures of the outer wall 8 and the lamp device is likewise less sensitive to fluctuations in the voltage of the current supply source.

It will be understood, of course, that a complete lamp unit comprises a body of heat insulating material interposed between the container 1 and the inner wall 9 of said jacket 6 and located along said container 1 at a part thereof between said septum 5 and the stem end thereof to close off the space between said container 1 and said inner wall 9 from the outside atmosphere and that said container 1 and said jacket 6 are provided with bases by which these elements are attached to a socket. These parts have been omitted from the drawing for purposes of simplicity of illustration.

While we have shown and described and have pointed out in the annexed claim certain novel features of the invention, it will be understood that various omissions, substitutions and changes in the forms and details of the device illustrated and in its use and operation may be made by those skilled in the art without departing from the broad spirit and scope of the invention, for example, different types of gaseous electric discharge lamp devices, such as an elongated U-shaped tubular lamp of the positive column type is mounted in said jacket 6, when desired; the invention is useful in connection with lamp devices of the type wherein the container thereof is tubular, has thermionic electrodes sealed into the opposite ends thereof and is enclosed by an evacuated envelope and in connection with lamp devices of the high, unsaturated vapor pressure type generally.

What we claim as new and desire to secure by Letters Patent of the United States is:—

A lamp unit comprising in combination a gaseous electric discharge lamp device and a heat conservator therefor, said conservator consisting of a double walled jacket separably mounted about said lamp and a material in the space between the walls of said jacket which material gives off gaseous matter in response to increasing ambient temperature and which returns to its original state when the temperature drops.

WILLEM UYTERHOEVEN.
CORNELIS VERBURG.